US012430682B1

(12) United States Patent
Sahoo (10) Patent No.: US 12,430,682 B1
(45) Date of Patent: Sep. 30, 2025

(54) SYSTEMS, METHODS, AND DEVICES FOR AUTOMATING EMAIL TO ORDER USING GENERATIVE ARTIFICIAL INTELLIGENCE (AI)

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/968,711

(22) Filed: Dec. 4, 2024

(51) Int. Cl.
*G06Q 30/0601* (2023.01)
*G06F 16/27* (2019.01)
*G06F 40/205* (2020.01)
*H04L 51/21* (2022.01)

(52) U.S. Cl.
CPC ......... *G06Q 30/0635* (2013.01); *G06F 16/27* (2019.01); *G06F 40/205* (2020.01); *H04L 51/21* (2022.05)

(58) Field of Classification Search
CPC . G06Q 30/00; G06Q 30/0633; G06Q 30/0635
See application file for complete search history.

(56) References Cited

U.S. PATENT DOCUMENTS

| | | | | |
|---|---|---|---|---|
| 9,652,530 B1* | 5/2017 | Bendersky | ............... | G06F 16/83 |
| 10,699,329 B2* | 6/2020 | Zakula | ............... | G06Q 30/0635 |
| 2010/0250598 A1* | 9/2010 | Brauer | ............... | G06F 16/319 |
| | | | | 707/E17.071 |
| 2015/0032526 A1* | 1/2015 | Calman | ............... | G06Q 30/0224 |
| | | | | 705/26.7 |
| 2018/0024986 A1* | 1/2018 | Singh | ............... | H04L 67/10 |
| | | | | 704/9 |
| 2023/0030234 A1* | 2/2023 | Fichuk | ............... | G06F 40/143 |

OTHER PUBLICATIONS

Mailparser, "Enter Mailparser: Your slotion for data entry", https://mailparser.io/email-to-erp/, dated: 2024. (Year: 2024).*

* cited by examiner

*Primary Examiner* — Jeffrey A. Smith
(74) *Attorney, Agent, or Firm* — Ice Miller LLP (57) ABSTRACT

Systems and methods provide for automating the conversion of email orders into structured order entries using generative AI, leveraging an integrated architecture comprising a Real-Time Data Mesh (RTDM), Advanced Analytic and Machine Learning (AAML) Module, and Single Pane of Glass (SPoG) User Interface. The system includes an Email Parser that extracts order information from emails, an Order Generation Engine that converts this information into structured entries, and an Integration Gateway that synchronizes the entries with external systems. The RTDM manages data flow and transformation, while the AAML provides predictive analytics and process automation. The SPOG UI performs real-time data visualization and user interaction. The system enhances order processing efficiency, accuracy, and scalability, enabling businesses to process email orders with minimal manual effort and greater precision.

20 Claims, 6 Drawing Sheets

SYSTEMS, METHODS, AND DEVICES FOR AUTOMATING EMAIL TO ORDER USING GENERATIVE ARTIFICIAL INTELLIGENCE (AI)

BACKGROUND

Conventional order processing depends on manual procedures to handle orders received via various communication channels, particularly email. Typically, when an order is submitted through email, it requires a staff member to manually review the email's content, identify the relevant order information, such as product descriptions, quantities, pricing, and customer details, and then input this data into the company's order management system. This manual process is not only labor-intensive but also introduces significant risks of human error. Misinterpretations of unstructured text, typos, or the omission of important details can lead to incorrect order fulfillment, dissatisfied customers, and ultimately, loss of business.

Moreover, traditional systems often struggle with the variability in email formats and attachments. Orders can come in various forms, including plain text, Portable Document Formats (PDFs), spreadsheets, or other document types, each requiring different handling procedures. Without a standardized process or sophisticated tools to automate data extraction, the burden falls on employees to manually parse these documents. This inconsistency leads to delays and inefficiencies, particularly when dealing with large volumes of orders or when orders are received in non-standard formats that the system does not easily accommodate.

Data standardization and normalization present additional challenges in conventional systems. Manually inputted order data often lacks consistency, particularly when dealing with product codes, units of measure, or currency conversions. For instance, product codes used by customers might not match the internal codes used by the company's systems, requiring manual cross-referencing and adjustments. Similarly, if customers use different units of measure or currencies, these must be manually converted to the standard units or currency used by the company. Such tasks are prone to errors and can lead to discrepancies in order processing, inventory management, and billing.

Further, the integration of conventional order processing systems with external platforms like Enterprise Resource Planning (ERP) systems, Customer Relationship Management (CRM) systems, or supply chain management tools is typically limited and often requires manual intervention. Data synchronization between these systems is usually not automated, necessitating additional steps to ensure that order details are accurately reflected across all platforms. This lack of integration can result in delays, data inconsistencies, and increased administrative overhead, all of which hinder the scalability and efficiency of the order processing workflow.

BRIEF SUMMARY OF THE INVENTION

Embodiments described herein provide an automated solution for converting email orders into structured order entries using generative AI, significantly improving efficiency, accuracy, and scalability in order processing workflows. This invention addresses the challenges associated with manual data entry, inconsistent data formats, and lack of integration with external systems. By automating the extraction, transformation, and synchronization of order information, the described system reduces human error and minimizes manual intervention.

In some embodiments, a system is provided that automates the conversion of email orders into structured entries. The system includes a server coupled to a processor that executes instructions to receive and analyze email content using an email parser. The parser extracts order details and transforms them into a standardized format. An order generation engine then converts this data into structured order entries, which are synchronized with external systems such as ERP and CRM platforms via an integration gateway. The system manages data flow and ensures data consistency across the process, enhancing overall operational efficiency.

For example, a computing device can perform a method that includes receiving an email with order details, parsing the email content to extract relevant information, and converting the extracted data into structured order entries. The method can further include steps to standardize and cleanse the data, optimize order generation using predictive analytics, and synchronize the order with external systems. The method also provides for presenting the order to users for review and confirmation through a user interface, and generating notifications to relevant stakeholders once the order is finalized.

In some embodiments, a computing device can execute instructions stored on a non-transitory computer-readable medium to perform operations similar to those described for the system and method claims. These operations include receiving and parsing email content, converting the parsed data into structured order entries, and synchronizing the order with external systems. Additionally, the computing device can manage data flow, apply business rules and predictive analytics, and present the final order for user confirmation, ensuring accurate and efficient order processing across various business environments.

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
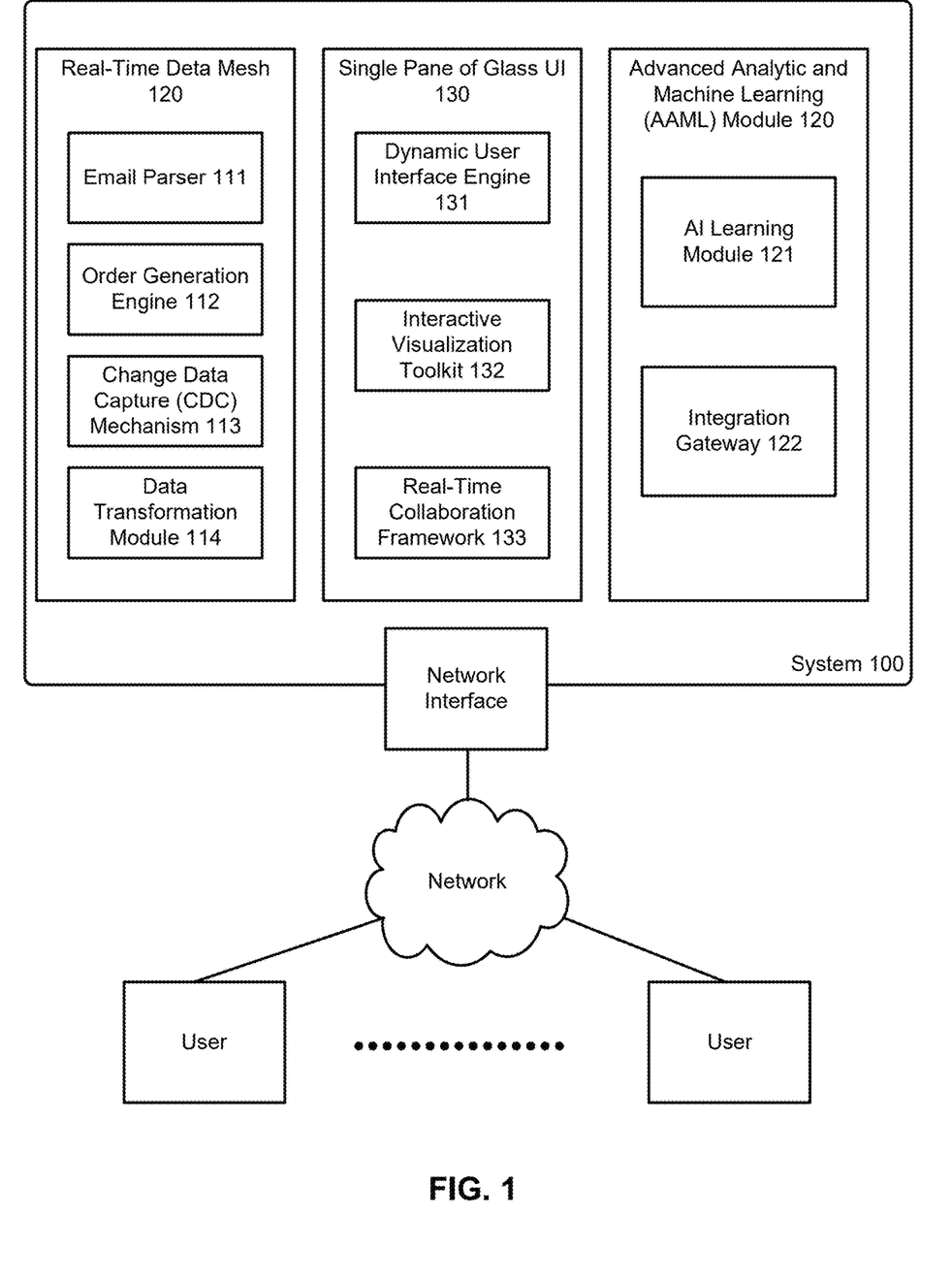
FIG. 1 is an illustration of a system for automating the conversion of email orders into structured order entries using generative AI, according to some embodiments.

FIG. 1 illustrates System 100, a platform configured to automate the conversion of email orders into structured order entries using generative AI. System 100 is configured to operate under an overarching architecture comprising the Real-Time Data Mesh (RTDM) 110, the Advanced Analytic and Machine Learning (AAML) Module 120, and the Single Pane of Glass (SPoG) User Interface 130. This integrated system can perform the ingestion, processing, and presentation of data related to email orders, enabling efficient and automated order management.

System 100 can include several core components that interact within the broader architecture. At the heart of the email-to-order functionality is the Email Parser 111. The Email Parser 111 is configured to receive and analyze incoming emails, extracting relevant order information such as product descriptions, quantities, customer details, and any attachments like PDFs or spreadsheets. In some embodiments, the Email Parser 111 can employ large language model (LLM) techniques such as natural language processing (NLP), transformer-based architectures, contextual embedding generation, and other related methodologies, to interpret unstructured text within the email body, identifying data points even when the email lacks a standardized format. The parser can integrate with the RTDM 110, which provides a data layer, to cross-reference extracted information with existing data records, ensuring consistency and accuracy.

The Email Parser 111 can be configured to process various types of email formats and attachments, including plain text, HTML, PDFs, and spreadsheets. In some embodiments, the Email Parser can employ LLM techniques such as NLP, transformer-based architectures, contextual embedding generation, and other related methodologies, to interpret unstructured text within the email body, extracting key data points such as product names, quantities, customer details, and special instructions. The Email Parser can also process attachments using Optical Character Recognition (OCR) for text-based images within PDFs or spreadsheets. For example, when an email includes a PDF invoice attachment, the Email Parser can extract the relevant order information, such as line items and pricing, and convert it into a structured format. This information can then be sent to the data layer for further processing. In another example, the Email Parser can identify customer-specific product codes and map them to standardized product identifiers used by the system, facilitating accurate order processing.

Email Parser 111 can leverage generative AI models such as GPT (Generative Pre-trained Transformer) or BERT (Bidirectional Encoder Representations from Transformers) to interpret and extract information from unstructured email content. These models can be fine-tuned on datasets specific to the types of emails typically received by the system, enabling the parser to handle diverse formats and phrasing. For example, the generative AI can be trained to understand variations in product descriptions, customer requests, and shipping instructions, which might be expressed in different ways across emails. In some embodiments, the AI can generate potential interpretations of ambiguous text within an email and select the most probable one based on context, such as when a customer uses non-standard terminology for a product. The generative AI can also be configured to recognize patterns in emails that indicate implicit requests or preferences, such as detecting a customer's usual delivery method even when it is not explicitly stated in the order. Generative AI models, such as GPT (Generative Pre-trained Transformer) and BERT (Bidirectional Encoder Representations from Transformers), can be specifically trained and fine-tuned on datasets relevant to the types of emails typically received by the system. This training process can involve the use of large, annotated datasets containing historical email orders, product descriptions, customer interactions, and other relevant data. Fine-tuning these models involves adjusting their parameters to optimize performance for specific tasks, such as accurately extracting order information from unstructured text.

In some embodiments, the training datasets can include a combination of publicly available datasets and proprietary data gathered from the system's previous order processing history. The AI models can be subjected to supervised learning, where they learn from labeled examples, and unsupervised learning, where they detect patterns in unlabeled data. The fine-tuning process may involve iterative testing and validation, where the models are evaluated on their ability to correctly interpret diverse email formats and product descriptions.

Furthermore, the generative AI models can be configured to adapt to new data formats or changes in customer behavior through continuous learning mechanisms. For instance, when the system encounters a new email format or an unfamiliar product description, the AI can analyze this new data and update its internal models accordingly. This adaptability ensures that the system remains robust and effective in dynamically evolving environments. In some embodiments, reinforcement learning techniques can be employed, where the AI receives feedback based on the accuracy of its predictions and adjusts its strategies to improve future performance.

The Order Generation Engine 112 is configured to convert the parsed data into structured order entries. This engine can interact with the AAML 120 to apply complex rules and algorithms that determine how the extracted data should be structured. For example, in a non-limiting example, the Order Generation Engine 112 can map customer-specific product codes in an email to the standardized product identifiers used within the system. The engine can also be configured to process different data formats, such as transforming free-text quantities into standardized units or converting currency values based on real-time exchange rates. The AAML 120 can support these processes by providing predictive analytics that optimize the order generation based on historical data, customer preferences, and operational patterns.

The Order Generation Engine 112 can be configured to convert the extracted data into structured order entries by applying business logic and data normalization techniques. This engine can interact with the AAML 120 to apply predictive analytics and decision-making algorithms. For instance, the Order Generation Engine can determine the appropriate pricing, apply discounts based on customer loyalty, or calculate tax and shipping costs. In some embodiments, the engine can also normalize data formats, such as converting different units of measure or currency values into standardized formats used by the system. For example, if a customer's email specifies quantities in different units (e.g., dozens, pieces), the Order Generation Engine can convert these into a single standard unit (e.g., individual items) before generating the final order entry.

Order Generation Engine 112 can use generative AI to automatically generate structured order entries from the parsed data. The AI can employ algorithms such as sequence-to-sequence models or Transformer networks to map the unstructured data extracted from the email into a structured format compatible with the company's internal order management system. For instance, the AI can automatically generate order line items by combining product information, quantities, and pricing, considering the business rules configured within the system. The generative AI can also handle cases where data is incomplete or unclear by generating likely values based on historical data or similar past orders. For example, if a customer omits a shipping method, the AI can suggest or automatically select a default option based on previous orders from that customer. In other use cases, the AI might dynamically create custom order templates for different customers, allowing for quick and accurate order processing.

The RTDM 110, acting as the data layer of System 100, is configured to manage the flow of data throughout the system. RTDM 110 can include one or more Application Programming Interfaces (APIs) that facilitate communication and integration with external systems, such as ERP, CRM, or supply chain management platforms. These APIs enable the system to ingest, transform, and synchronize data in real-time, ensuring that current information is available across components of the system. By leveraging these APIs, RTDM 110 enhances the interoperability and scalability of the system, supporting efficient and accurate order processing.

RTDM 110 can include a Change Data Capture (CDC) Mechanism 113, which is configured to detect any updates or modifications to the data associated with an order as it is processed. For instance, if a customer updates their order details or if there is a change in product availability, the CDC Mechanism 113 can capture these changes in real-time and update the order data accordingly. This real-time data synchronization ensures that components of System 100 operate with current information, reducing the risk of errors or discrepancies in order processing.

Within the data layer, the Data Transformation Module 114 can be configured to process the conversion of raw, unstructured email data into a format suitable for analysis and integration into the system. This module can perform data cleansing, normalization, and enrichment processes, leveraging machine learning models to enhance data quality and consistency. For example, in some embodiments, the Data Transformation Module 114 can normalize product names and categories extracted from an email to match the standardized terms used within the system, facilitating accurate inventory management and reporting.

The AAML 120, serving as the processing layer of System 100, is configured to process the analytical tasks associated with the email-to-order conversion. AI Learning Module 121 within the AAML 120 can be configured to improve the accuracy of the Email Parser 111 and the Order Generation Engine 112. This module can use feedback from previous orders to refine its algorithms, learning from past mistakes and adapting to new types of emails or order formats. For example, if the system encounters a new email format that it has not processed before, the AI Learning Module 121 can analyze the new data, update its models, and improve its ability to process similar emails in the future.

In some embodiments, AAML Module 120 can be configured to perform complex data analysis and apply machine learning models to optimize the order processing workflow. This module can include an AI Learning Module that continuously refines the parsing and order generation processes by analyzing feedback from previous orders. For example, if the system encounters a new email format or a unique product description, the AI Learning Module can adjust the parsing rules and improve its accuracy for future orders. The AAML can also include a Predictive Analytics Engine that forecasts demand, suggests alternative products if certain items are out of stock, or recommends expedited shipping options based on customer preferences and historical data.

In some embodiments, AAML Module 120 can integrate generative AI to optimize the order processing workflow by continuously learning from new data and adapting to changing patterns. One approach could involve the use of Reinforcement Learning (RL) algorithms, where the AI models are trained to maximize efficiency in the order generation process by receiving feedback on their performance. The AI could be rewarded for correctly predicting customer preferences or for generating accurate and complete order entries with minimal human intervention. Over time, the system becomes more adept at handling complex or unusual orders, reducing the need for manual adjustments.

In some embodiments, the AAML 120 can use Variational Autoencoders (VAEs) or Generative Adversarial Networks (GANs) to simulate and predict potential scenarios in order fulfillment. For instance, VAEs could be used to model the distribution of order quantities and delivery times, allowing the system to generate realistic scenarios for inventory management or shipping logistics. GANs could be employed to test the robustness of the order generation process by generating synthetic but realistic email orders that the system must process, thereby identifying potential weaknesses or areas for improvement. These simulations can be particularly valuable in stress-testing the system's ability to handle large volumes of orders during peak times or in identifying edge cases that might not be covered by standard operating procedures.

In some embodiments, alternative generative AI techniques might include the use of Long Short-Term Memory (LSTM) networks for tasks that require the processing of sequential data, such as understanding the sequence of instructions in a customer's email. LSTMs can be particularly useful in scenarios where the order details are spread across multiple sentences or paragraphs in the email, requiring the AI to maintain context over longer text spans.

In some non-limiting examples, a customer might send an email with a partial or ambiguous order, such as "send the usual order but with a few extras." The generative AI can interpret this request by analyzing the customer's order history, generating a complete and accurate order entry based on previous patterns, and adding suggested extras based on similar customer profiles. In another example, if a new product is introduced, the generative AI can automatically learn its details from the first few orders and start recognizing it in subsequent emails, ensuring that the product is handled correctly without requiring manual updates to the system.

The Integration Gateway 122 is configured to facilitate data integration between the email order system and external platforms, such as Enterprise Resource Planning (ERP) systems, Customer Relationship Management (CRM) systems, or other supply chain management tools. This gateway can be configured to ensure that the generated order entries are integrated into the broader enterprise systems, enabling end-to-end automation of the order processing workflow. In a non-limiting example, the Integration Gateway 122 can automatically push the generated order entries into an ERP system for further processing, such as inventory allocation, shipping, and invoicing.

The Integration Gateway 122 can be configured to facilitate data exchange between the email-to-order system and external enterprise platforms, such as ERP, CRM, or supply chain management systems. This gateway can support various communication protocols and data formats, enabling it to integrate with a wide range of external systems. For instance, the Integration Gateway can automatically push generated order entries to an ERP system for inventory allocation, or update a CRM system with the latest customer order information. In another use case, the gateway can synchronize order data in real-time, ensuring that all connected systems have access to the most current information, thereby reducing the risk of data discrepancies or delays in order fulfillment.

Integration Gateway 122 can also benefit from generative AI by automating the creation of integration scripts or API calls required to synchronize data with external systems. For example, the AI could generate and test API requests in real-time, ensuring that the structured order data is correctly transmitted to an ERP system or a CRM platform. In a non-limiting example, if the external system undergoes a schema change, the generative AI can dynamically adapt the integration scripts to accommodate the new structure, thereby preventing disruptions in data flow.

System 100 also includes the SPOG UI 130, which is configured to present the generated order entries and related data to the end-users. The Dynamic User Interface Engine 131 can be configured to provide a customizable interface, allowing users to view and interact with the order data according to their preferences. The SPOG UI 130 can also include an Interactive Visualization Toolkit 132, which can be configured to offer various data visualization options, such as real-time dashboards, order tracking maps, and predictive scenario modeling. These visualizations can help users monitor order processing in real-time, identify potential issues, and make informed decisions.

Additionally, the SPOG UI 130 can be configured to support Real-Time Collaboration Framework 133, enabling multiple users to work together on order management tasks within the system. For example, in some embodiments, a sales representative and a logistics manager could collaborate in real-time to review and adjust an order before it is finalized, ensuring that aspects of the order are accurate and aligned with the customer's needs.

System 100's architecture, underpinned by the RTDM 110, AAML 120, and SPOG UI 130, is configured to offer a comprehensive solution for automating the email-to-order process. By leveraging advanced data management, analytics, and user interface capabilities, System 100 can significantly reduce the manual effort involved in processing email orders, improving efficiency, accuracy, and scalability across various business operations. In a non-limiting example, a customer could send an email with a PDF attachment containing an order list, and System 100 would automatically parse the email, generate a structured order entry, and present it to the user for final review, rapidly even in real-time. This automated approach streamlines the order processing workflow and enables businesses to process larger volumes of orders with greater precision and speed.

Figure 2:
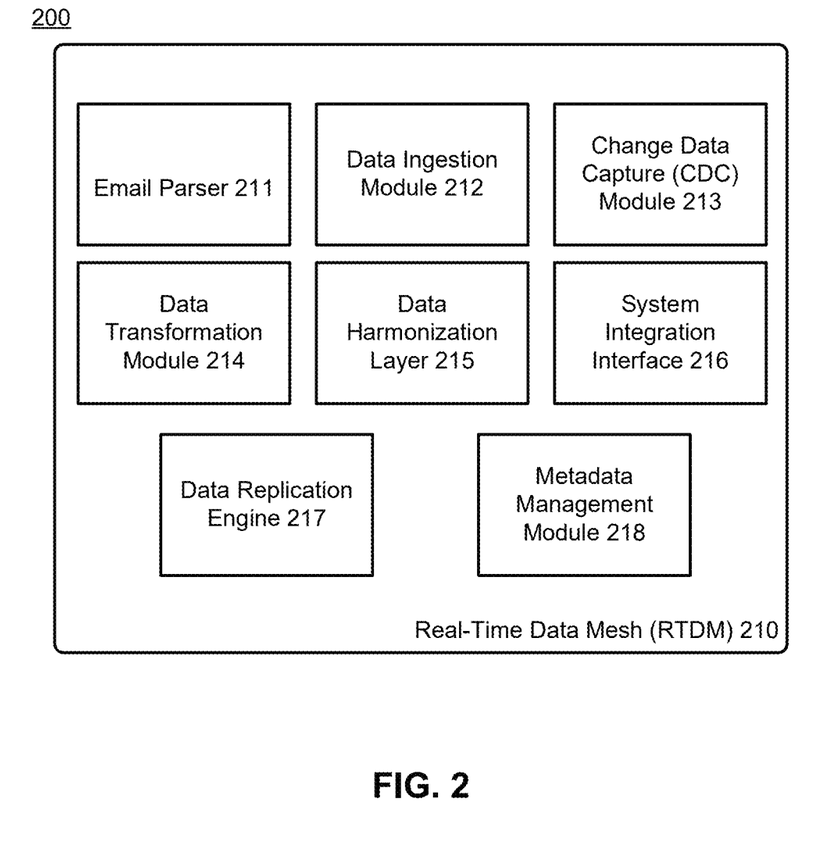
FIG. 2 is an illustration of a Real-Time Data Mesh (RTDM) within the system architecture, configured to manage data ingestion, transformation, and synchronization related to email orders, according to some embodiments.

FIG. 2 illustrates System 200, including the RTDM 210, configured to manage the flow of data related to the email-to-order process. System 200 is configured to process real-time data ingestion, transformation, and synchronization, ensuring that data used in generating and processing orders remains current and accurate across various interconnected systems.

System 200 can include an Email Parser 211 configured to ingest and process incoming emails. The Email Parser 211 can be configured to interface directly with the RTDM 210, which provides the backbone for managing data flows within the system. In some embodiments, the Email Parser 211 can work in tandem with a Data Ingestion Module 212 within the RTDM 210. The Data Ingestion Module 212 can be configured to process the intake of data from various sources, including email servers, cloud storage, and external databases. For example, when an email containing an order is received, the Data Ingestion Module 212 can capture the email and any attachments, ensuring that relevant data is available for processing.

Once the data is ingested, the Change Data Capture (CDC) Mechanism 213 within the RTDM 210 is configured to monitor any updates or modifications to the data as it is processed. The CDC Mechanism 213 can be particularly useful in scenarios where the order details might change after the initial email is processed. For example, if a customer sends a follow-up email with revised order quantities or additional product requests, the CDC Mechanism 213 can detect these changes in real-time and update the relevant data within the system. This real-time update capability ensures that the order generation process reflects accurate and current information.

System 200 can also include a Data Transformation Module 214 within the RTDM 210, configured to convert raw, unstructured email data into a format that can be easily integrated into the broader system. The Data Transformation Module 214 can be configured to perform functions including data cleansing, normalization, and enrichment. In a non-limiting example, the module can standardize product names and categories extracted from an email to match the taxonomy used within the system, ensuring consistency in how data is stored and retrieved. The module can also be configured to validate the extracted data against predefined business rules, such as ensuring that product quantities are within allowable limits or that customer details are complete and accurate.

The RTDM 210 can also incorporate a Data Harmonization Layer 215, which is configured to ensure that data from various sources is consistent and aligned across the system. The Data Harmonization Layer 215 can be particularly valuable in environments where data is sourced from multiple systems, such as legacy ERP systems, CRM platforms, and third-party data providers. By harmonizing data from these disparate sources, the RTDM 210 ensures that the system operates with a single, unified view of the data, reducing the likelihood of errors or discrepancies in order processing.

System 200 can integrate with external enterprise systems through a System Integration Interface 216. This interface can be configured to facilitate data exchange between the RTDM 210 and external systems such as ERP, CRM, or supply chain management platforms. In some embodiments, the System Integration Interface 216 can be configured to support multiple communication protocols, enabling integration with a wide range of external systems. For instance, in a non-limiting example, the interface could be configured to synchronize order data between the RTDM 210 and an ERP system in real-time, ensuring that inventory levels and order statuses are always current.

System 200's architecture also supports advanced data replication and redundancy mechanisms through a Data Replication Engine 217. The Data Replication Engine 217 can be configured to replicate data across multiple nodes within the RTDM 210, ensuring high availability and fault tolerance. This facilitates uninterrupted access to data during high-volume order processing periods. In a non-limiting example, if one node in the RTDM 210 becomes unavailable, the Data Replication Engine 217 can ensure that the data remains accessible from other nodes, minimizing the risk of downtime or data loss.

Metadata Management Module 218 can be configured to manage and maintain metadata associated with the ingested and processed data. The Metadata Management Module 218 can be configured to store information about the source, structure, and history of the data, enabling enhanced data governance and traceability. For example, in some embodiments, the module can track the lineage of data as it flows through the system, providing a detailed audit trail that can be used for compliance purposes or to troubleshoot issues.

The RTDM 210's integration with the broader system architecture, including the AAML and SPOG UI, facilitates data flow and processing. The RTDM 210 can be configured to feed processed and harmonized data into the AAML for further analysis, where advanced algorithms and machine learning models can be applied to generate insights and optimize the order processing workflow. The data can then be presented to users through the SPOG UI, allowing for real-time monitoring and interaction with the order data.

Figure 3:
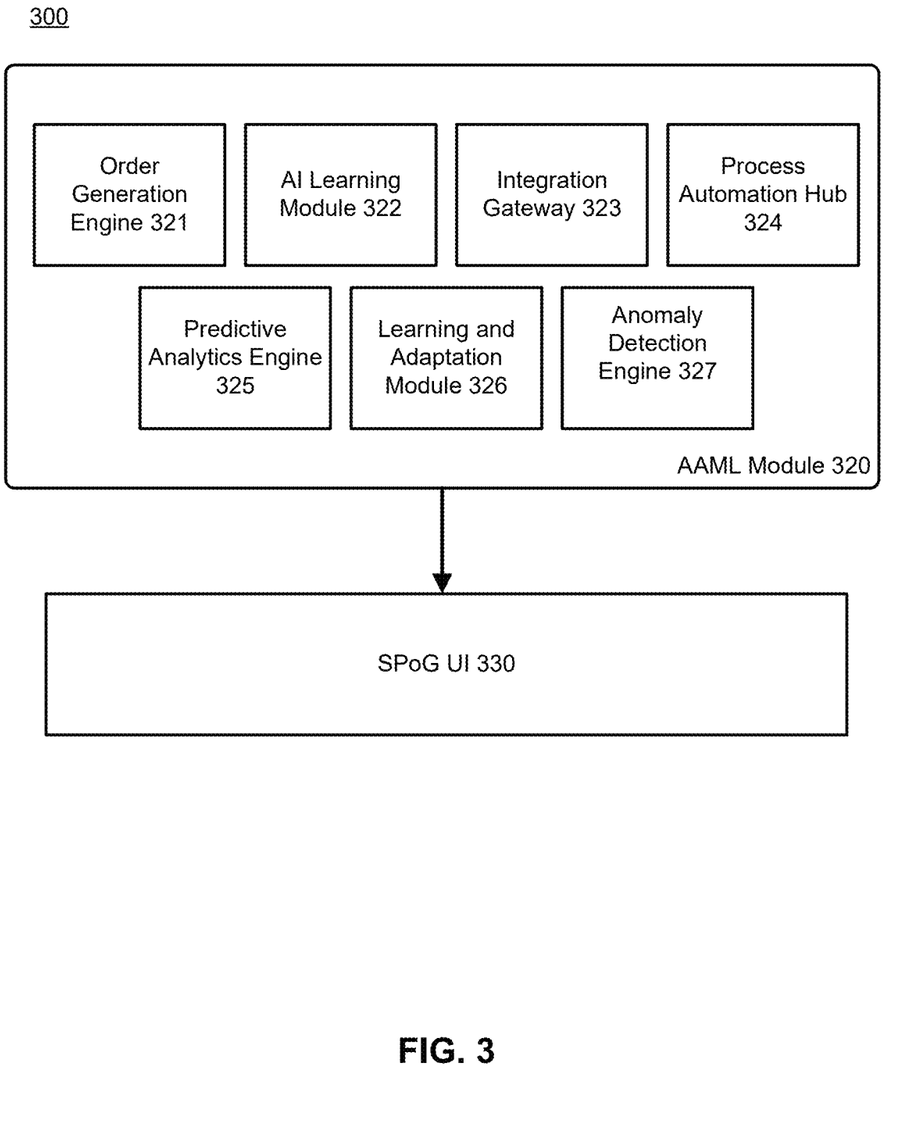
FIG. 3 is an illustration of an Advanced Analytic and Machine Learning (AAML) Module within the system architecture, configured to perform data analysis, predictive modeling, and process automation for generating structured order entries, according to some embodiments.

System 200's comprehensive data management capabilities, driven by the RTDM 210, enable the automation and optimization of the email-to-order process. In a non-limiting example, when a customer sends an email order with a list of products, the system can automatically ingest the email, process the data in real-time, harmonize it with existing data, and generate a structured order entry that is ready for review and confirmation by the user. This level of automation reduces manual effort, minimizes errors, and ensures that orders are processed quickly and accurately, enhancing overall operational efficiency. FIG. 3 illustrates System 300, including the AAML Module 320, which provides the core processing layer of the email-to-order system. System 300 is configured to perform complex data analysis, predictive modeling, and process automation, for converting parsed email data into structured and actionable order entries.

System 300 can include the Order Generation Engine 321, configured to process the data extracted by the Email Parser and convert it into structured order entries. The Order Generation Engine 321 can leverage advanced machine learning algorithms and business logic housed within the AAML 320 to determine how best to structure the data. For example, in a non-limiting example, if the email contains a list of products with varying formats—such as different units of measure or currencies—the Order Generation Engine 321 can be configured to normalize these details according to the system's predefined standards, ensuring that the resulting order is consistent and accurate.

The AAML 320 can also include an AI Learning Module 322, configured to continuously improve the accuracy and efficiency of the system's processes. The AI Learning Module 322 can employ techniques such as supervised learning, reinforcement learning, and deep learning to refine its models based on feedback from previous order processing tasks. In some embodiments, the AI Learning Module 322 can analyze patterns in historical email orders to predict potential issues or errors in new orders, proactively adjusting the Order Generation Engine 321 to avoid these pitfalls. For instance, if the AI Learning Module 322 detects that phrases or formats in past emails led to incorrect order entries, it can modify its parsing and processing rules to better process similar situations in the future.

The Integration Gateway 323 within the AAML 320 is configured to facilitate data exchange between the email-to-order system and external enterprise platforms. This gateway can be configured to integrate with various systems, such as ERP, CRM, or supply chain management platforms, ensuring that the structured order entries generated by the Order Generation Engine 321 are automatically synchronized with these external systems. The Integration Gateway 323 can support multiple data formats and communication protocols, making it adaptable to different enterprise environments. For example, in a non-limiting example, the gateway could automatically push the generated order data to an ERP system for inventory allocation, or to a CRM system for customer tracking, without requiring any manual intervention.

System 300 can also feature a Process Automation Hub 324, configured to automate various workflows within the email-to-order system. The Process Automation Hub 324 can be used to orchestrate complex processes, such as order validation, pricing adjustments, and inventory checks, by integrating with both the AAML 320 and other system components, such as the RTDM 310 and SPOG UI 330. In some embodiments, the Process Automation Hub 324 can be configured to perform conditional logic, such as automatically applying discounts based on customer loyalty or adjusting delivery timelines based on current inventory levels. This automation reduces the need for manual oversight and ensures that orders are processed quickly and accurately.

Predictive Analytics Engine 325 can be configured to perform advanced data analysis and generate predictive insights. The Predictive Analytics Engine 325 can analyze historical order data, customer behavior patterns, and external market factors to forecast future trends and make informed decisions during the order generation process. For example, in a non-limiting example, the Predictive Analytics Engine 325 could predict a spike in demand for a particular product based on recent trends and automatically adjust inventory levels or recommend alternative products if stock levels are low. This capability helps the system optimize order fulfillment and improve customer satisfaction.

The AAML 320 can also integrate a Learning and Adaptation Module 326, configured to adapt the system's processing strategies based on real-time data and operational feedback. This module can monitor the performance of the Order Generation Engine 321, the Integration Gateway 323, and other components, making adjustments as needed to optimize system efficiency. For instance, if the system detects that email formats are taking longer to process, the Learning and Adaptation Module 326 can refine the parsing algorithms or reconfigure the data transformation workflows to improve processing speed.

In addition to these core components, System 300 can include an Anomaly Detection Engine 327, configured to identify and flag potential issues during the order processing workflow. The Anomaly Detection Engine 327 can analyze data streams from the RTDM 310, the AAML 320, and external systems to detect irregularities such as discrepancies in order details, inconsistencies in pricing, or unusual patterns in customer behavior. When an anomaly is detected, the engine can trigger alerts or automated responses, such as pausing the order processing workflow for further review or applying corrective actions to resolve the issue.

The outputs generated by the AAML 320, including structured order entries, predictive insights, and process automation results, can be fed into the SPOG UI 330 for presentation to the user. The SPOG UI 330 is configured to provide a dynamic and customizable interface, allowing users to interact with the order data, monitor the status of ongoing processes, and make informed decisions based on the insights generated by the AAML 320.

Figure 4:
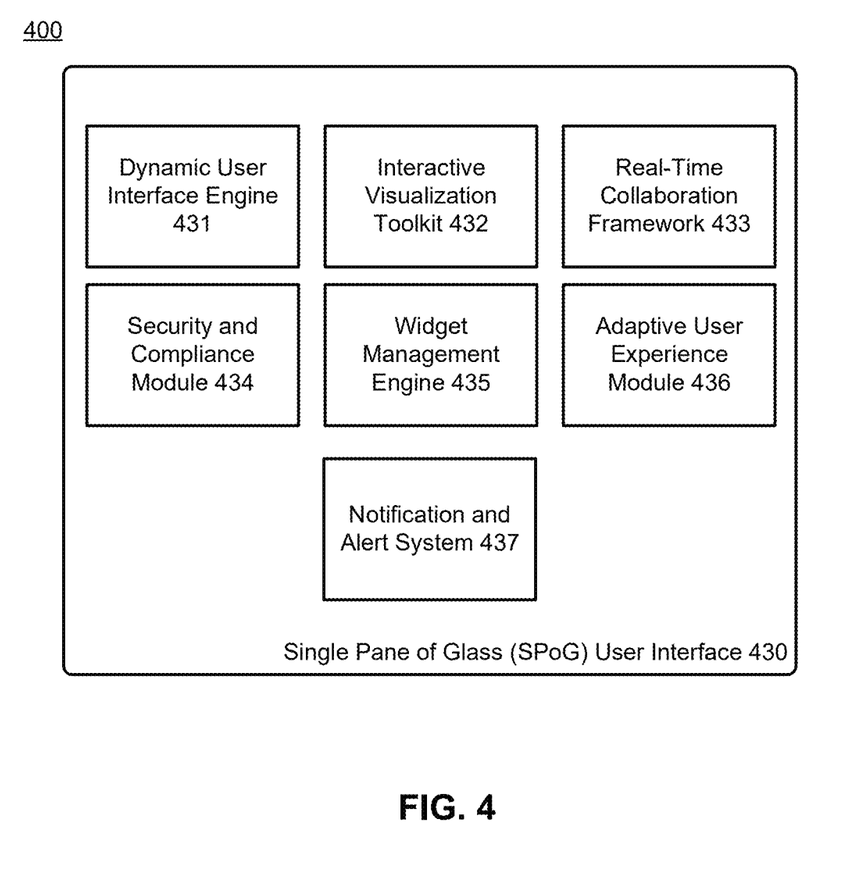
FIG. 4 is an illustration of a Single Pane of Glass (SPoG) User Interface (UI) within the system architecture, configured to present and manage structured order entries generated from email orders, according to some embodiments.

System 300, with its advanced analytic and machine learning capabilities, is configured to optimize the email-to-order process by automating data processing, enhancing decision-making, and improving overall efficiency. In a non-limiting example, when a customer sends an email order, the system can automatically parse the email, generate a structured order entry, apply predictive analytics to optimize inventory allocation, and synchronize the order data with external enterprise systems—while continuously learning and adapting to improve future performance. This comprehensive approach enables businesses to process email orders more effectively, reducing manual effort, minimizing errors, and accelerating order fulfillment. FIG. 4 illustrates System 400, which focuses on the SPOG UI 430, configured as the presentation layer of the email-to-order system. System 400 integrates the outputs from the RTDM and the AAML Module to provide users with a dynamic, interactive, and customizable interface for managing and monitoring order processes generated from email orders.

System 400 can include the Dynamic User Interface Engine 431, a core component configured to deliver a highly customizable and user-centric experience. The Dynamic User Interface Engine 431 can present order data, analytics, and system notifications in a format tailored to the specific needs and roles of each user. For example, in a non-limiting example, a sales representative might view a dashboard focused on order statuses and customer interactions, while a supply chain manager might see real-time inventory levels and shipping schedules. This flexibility ensures that each user can access relevant information quickly and efficiently, improving overall decision-making and operational efficiency.

The Interactive Visualization Toolkit 432 within the SPOG UI 430 is configured to provide users with advanced data visualization options. This toolkit can support a variety of visual formats, including graphs, charts, heat maps, and 3D models, enabling users to explore and analyze data interactively. In some embodiments, the Interactive Visualization Toolkit 432 can be configured to present predictive scenarios generated by the AAML, such as forecasting demand for specific products or visualizing potential supply chain disruptions. For example, in a non-limiting example, a user could use a 3D model to simulate the impact of a sudden increase in orders on inventory levels and delivery timelines, helping them to make informed adjustments before issues arise.

System 400 can also feature a Real-Time Collaboration Framework 433, configured to facilitate collaborative work across different departments and roles. The Real-Time Collaboration Framework 433 can enable multiple users to interact with the same set of data simultaneously, allowing for real-time updates, shared annotations, and collaborative decision-making. For instance, in some embodiments, a sales team member could flag a potential issue with an order that is immediately visible to a logistics manager, who can then adjust shipping plans accordingly. This collaborative environment reduces the need for back-and-forth communication and helps ensure that stakeholders are informed throughout the order process.

The Security and Compliance Module 434 within the SPOG UI 430 is configured to manage the security and regulatory aspects of the data presented through the interface. This module can include features such as biometric authentication, role-based access controls, and advanced encryption standards to protect sensitive information and ensure that only authorized users can access or modify data. The Security and Compliance Module 434 can also be configured to monitor user activities within the SPOG UI 430, maintaining detailed logs for auditing purposes and ensuring compliance with relevant data protection regulations. For example, in a non-limiting example, the module could automatically flag any attempts to access restricted data or generate alerts if an unusual pattern of access is detected.

System 400's architecture supports a high degree of customization through the Widget Management Engine 435, which is configured to allow users to personalize their interface by selecting and arranging widgets according to their preferences. Widgets can represent various data elements, such as order summaries, customer details, inventory snapshots, or real-time alerts, and can be added, removed, or resized based on the user's needs. In some embodiments, the Widget Management Engine 435 can be configured to learn from user interactions, automatically suggesting widgets or layouts that might be most useful based on the user's past behavior. This adaptability helps users maintain an efficient workspace, focused on pertinent information.

Adaptive User Experience Module 436 can be configured to modify the interface dynamically based on the context of use and the specific tasks being performed. The Adaptive User Experience Module 436 can adjust the layout, functionality, and available tools within the SPOG UI 430 based on factors such as the user's role, the type of order being processed, or the urgency of the task. For instance, in a non-limiting example, if a user is handling a high-priority order, the Adaptive User Experience Module 436 might automatically highlight information, streamline the order approval process, and temporarily hide less relevant data to reduce distractions.

The Notification and Alert System 437 within the SPOG UI 430 is configured to keep users informed of important events and updates related to the email-to-order process. This system can generate real-time notifications for events such as new order submissions, changes to existing orders, or potential issues detected by the system's anomaly detection algorithms. In some embodiments, the Notification and Alert System 437 can be configured to deliver alerts through multiple channels, including in-app notifications, email, SMS, or even integrations with external communication platforms like Slack or Microsoft Teams. For example, in a non-limiting example, if an order is delayed due to a supply chain issue, the system could send an immediate alert to the relevant stakeholders, enabling them to take corrective action promptly.

System 400 also integrates with the broader architecture of the email-to-order system, enabling interaction with other system components such as the RTDM and AAML. Data processed and harmonized by the RTDM 410 can be displayed through the SPOG UI 430, allowing users to monitor the real-time status of data ingestion and transformation processes. Similarly, insights and predictive analytics generated by the AAML 420 can be visualized and acted upon within the SPOG UI 430, ensuring that users have access to current and relevant information.

Overall, System 400, through the SPOG UI 430, is configured to provide a comprehensive and user-friendly interface for managing the email-to-order process. By integrating advanced data visualization, real-time collaboration, security features, and adaptive user experiences, System 400 enables users to efficiently monitor and control the entire order processing workflow. In a non-limiting example, a user could receive a notification of a new email order, review the automatically generated order entry, collaborate with colleagues to confirm details, and approve the order for processing within a single, unified interface. This streamlined approach enhances user productivity, reduces the likelihood of errors, and supports faster, more informed decision-making.

Figure 5:
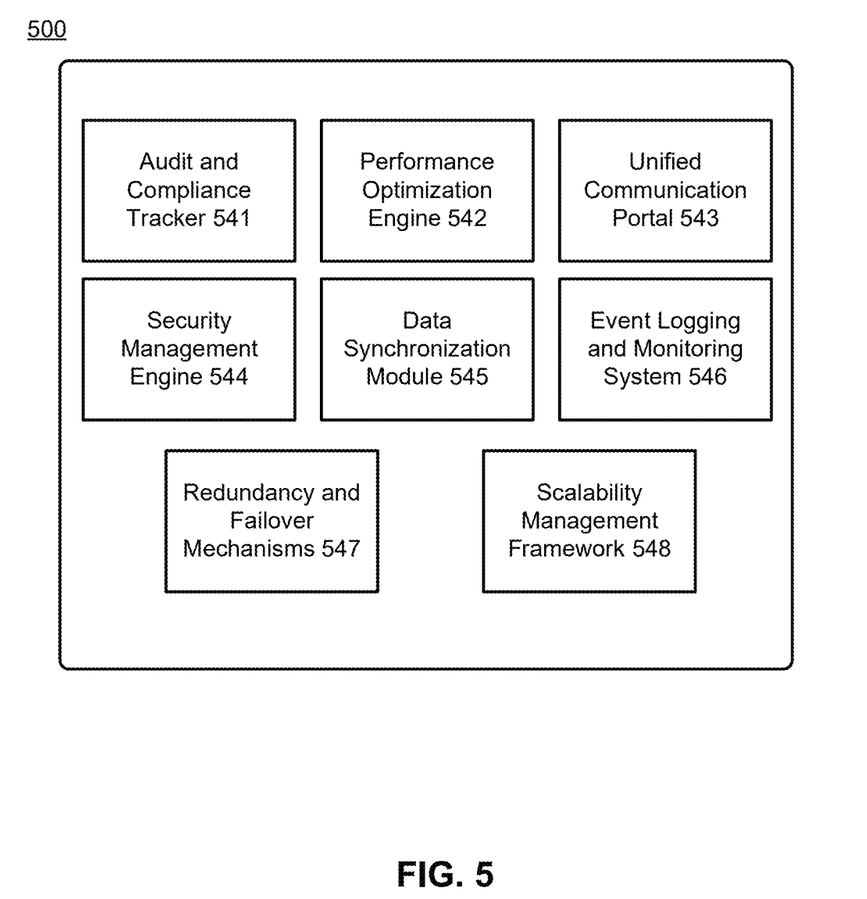
FIG. 5 is an illustration of cross-layer services within the system architecture, configured to enhance performance, security, compliance, and communication across the system, according to some embodiments.

FIG. 5 illustrates System 500, including the cross-layer services within the email-to-order system, which provide support functions that span across the RTDM, AAML Module, and the SPOG User Interface. System 500 is configured to enhance the system's overall performance, security, compliance, and communication capabilities, ensuring a cohesive and efficient operational environment.

System 500 can include an Audit and Compliance Tracker 541, configured to monitor and record operations within the email-to-order system to ensure compliance with internal policies and external regulations. The Audit and Compliance Tracker 541 can be configured to capture detailed logs of user activities, data access, and system modifications. These logs can be stored in a secure, tamper-proof environment within the RTDM, allowing for easy retrieval and review during audits. In some embodiments, the Audit and Compliance Tracker 541 can also generate compliance reports that highlight any deviations from standard operating procedures or potential regulatory breaches. For example, in a non-limiting example, if a user attempts to bypass a security protocol or access restricted data, the system could log the incident and alert the compliance team for further investigation.

The Performance Optimization Engine 542 is configured to dynamically adjust system resources and processing parameters to optimize performance across layers of the architecture. The Performance Optimization Engine 542 can monitor real-time system metrics, such as processing speed, data throughput, and server load, and make automatic adjustments to maintain optimal performance. For instance, in a non-limiting example, if the system detects a sudden spike in email orders, the Performance Optimization Engine 542 can allocate additional computational resources to the Order Generation Engine and the Data Transformation Module, ensuring that the increased workload is processed efficiently without delays. This engine can also integrate with the AAML to predict future performance bottlenecks and proactively adjust system settings to prevent them.

System 500 can also feature a Unified Communication Portal 543, configured to integrate various communication tools across the platform, enabling interaction among users, teams, and external stakeholders. The Unified Communication Portal 543 can support multiple communication channels, including voice, video, and text, and can be configured to facilitate both real-time and asynchronous communication. In some embodiments, the portal can integrate with popular communication platforms, such as Microsoft Teams or Slack, allowing users to interact with the email-to-order system directly from their preferred communication tools. For example, in a non-limiting example, a user could receive an alert about a new email order in Slack, review the order details, and collaborate with team members to confirm the order without leaving the Slack interface. This integration enhances user convenience and ensures that communication remains fluid and efficient across the entire system.

Security Management Engine 544 is configured to provide advanced security features that protect the system from unauthorized access, data breaches, and other security threats. The Security Management Engine 544 can include capabilities such as multi-factor authentication, encryption of data at rest and in transit, and continuous monitoring of system vulnerabilities. In some embodiments, the Security Management Engine 544 can also implement machine learning algorithms to detect and respond to potential security threats in real-time. For instance, in a non-limiting example, the engine could identify unusual login patterns that suggest a potential breach and automatically trigger additional security measures, such as requiring re-authentication or temporarily locking the affected user account.

System 500 can also include a Data Synchronization Module 545, configured to ensure that data across the system remains consistent and current. The Data Synchronization Module 545 can be particularly important in environments where data is distributed across multiple locations or systems, such as when the email-to-order system integrates with external ERP or CRM platforms. This module can be configured to monitor data changes in real-time and synchronize these changes across relevant systems, minimizing the risk of data discrepancies or conflicts. For example, in a non-limiting example, if an order is updated in the email-to-order system, the Data Synchronization Module 545 can ensure that this update is immediately reflected in the connected ERP system, maintaining consistency across platforms.

The Event Logging and Monitoring System 546 within System 500 is configured to provide comprehensive visibility into the system's operations and events. This system can capture and store detailed logs of system activities, including data processing events, user interactions, system errors, and performance metrics. The Event Logging and Monitoring System 546 can be configured to generate real-time alerts for events such as system failures or security breaches, and provide detailed reports for post-event analysis. In some embodiments, the system can also integrate with external monitoring tools, enabling organizations to track system performance and security metrics alongside other enterprise systems. For example, in a non-limiting example, an organization could use the Event Logging and Monitoring System 546 to track the frequency and nature of email order processing errors, identifying trends that could inform future system improvements.

System 500 also supports advanced Redundancy and Failover Mechanisms 547, configured to ensure high availability and resilience in the event of system failures or disruptions. The Redundancy and Failover Mechanisms 547 can include features such as automated backup of data, real-time replication of system processes across multiple servers, and failover to backup systems in the event of a primary system failure. In a non-limiting example, if a server handling the Order Generation Engine fails, the system could automatically switch to a backup server without interrupting the order processing workflow, ensuring that the system remains operational and that no data is lost.

Finally, System 500 can include a Scalability Management Framework 548, configured to allow the email-to-order system to scale efficiently as the volume of email orders or the complexity of processing requirements increases. The Scalability Management Framework 548 can be configured to dynamically allocate resources based on current system demands, ensuring that the system can process varying workloads without degradation in performance. In some embodiments, the framework can integrate with cloud-based resources, enabling the system to quickly scale up during peak periods or scale down during periods of low activity, optimizing resource usage and cost efficiency.

Overall, System 500 provides the foundational cross-layer services that support the robust operation, security, and scalability of the email-to-order system. By integrating components such as the Audit and Compliance Tracker, Performance Optimization Engine, Unified Communication Portal, and Security Management Engine, System 500 ensures that the system can operate efficiently, securely, and in compliance with relevant regulations. In a non-limiting example, these cross-layer services work together to enable order processing, real-time data synchronization, and comprehensive monitoring, providing a resilient and adaptable platform for managing email orders in a complex enterprise environment.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 6:
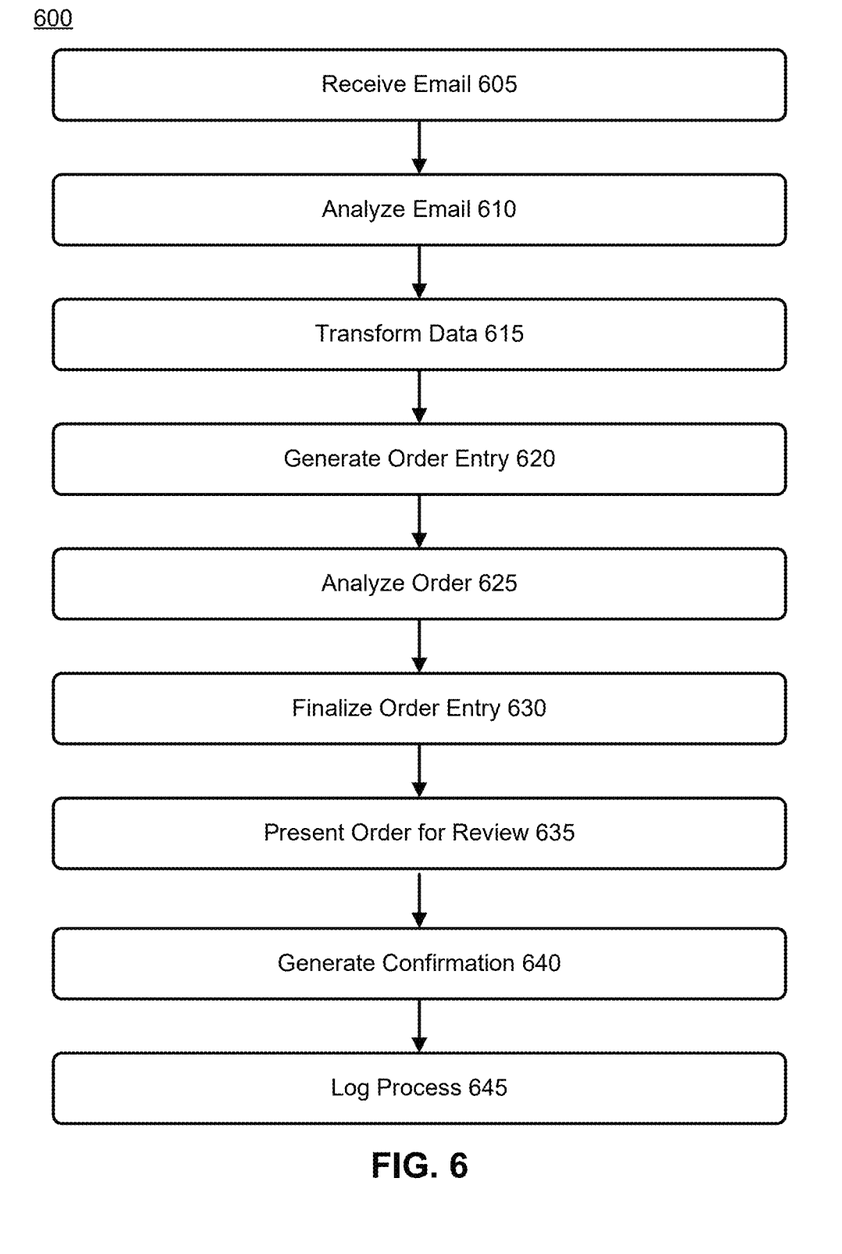
FIG. 6 is a flow diagram of a method for automating the conversion of email orders into structured order entries using generative AI, according to some embodiments.

FIG. 6 is a flow diagram of Method 600 for automating the email-to-order process using generative AI, according to some embodiments of the present disclosure. Method 600 provides a detailed process flow that outlines the operational steps involved in receiving, parsing, generating, and finalizing orders from emails within the integrated system architecture comprising the RTDM, AAML Module, and SPOG User Interface.

In some embodiments, Method 600 can begin at operation 605, where an email containing an order is received by the system. At this stage, the Email Ingestion Module can capture the email, including any attachments such as PDFs, spreadsheets, or other documents. This module can be configured to interface with various email servers or platforms to ensure secure email retrieval. Once the email is ingested, it is passed on to the next stage for analysis.

At operation 610, the Email Parser analyzes the content of the ingested email to extract relevant order information. This can include extracting product names, quantities, customer details, shipping information, and any additional order-related data. In some embodiments, the Email Parser can use LLM techniques such as NLP, transformer-based architectures, contextual embedding generation, and other related methodologies, to interpret unstructured text and identify relevant data points, even if the email does not follow a standardized format. The parser can also process attachments, such as extracting order information from a PDF invoice. The extracted data is then forwarded to the data processing layer for further action.

At operation 615, the extracted data undergoes transformation and normalization within the Data Transformation Module of the RTDM. Here, the system is configured to standardize and cleanse the data to ensure it is consistent with the system's internal data formats. For example, product names may be standardized to match the nomenclature used within the organization, and quantities might be normalized to the standard units used in inventory management. The Change Data Capture (CDC) Mechanism can be activated at this stage to monitor any updates or changes to the data as it is processed. This ensures that accurate and current information is used throughout the order generation process.

Following data transformation, at operation 620, the Order Generation Engine within the AAML is configured to convert the normalized data into a structured order entry. This engine can apply complex business logic and rules to determine the best way to structure the order. For instance, the engine might cross-reference the extracted customer details with existing customer records in the system to ensure accurate billing and shipping information. Additionally, the engine can calculate pricing, apply discounts, and generate necessary order line items based on the products and quantities extracted from the email.

At operation 625, the Predictive Analytics Engine within the AAML can be configured to perform an analysis of the generated order. This engine can provide insights and recommendations based on historical data, such as suggesting alternative products if items are out of stock, or recommending expedited shipping if the customer has a history of urgent orders. The AI Learning Module can be engaged to improve these recommendations by learning from past orders and adjusting its algorithms accordingly. The result is a fully optimized order entry that is tailored to the customer's needs and operational constraints.

At operation 630, the Order Entry is finalized and integrated into the broader enterprise systems through the Integration Gateway. This gateway is configured to synchronize the order data with external platforms such as ERP, CRM, or supply chain management systems, ensuring that the order is immediately actionable across relevant departments. For example, in a non-limiting example, the Integration Gateway can automatically push the finalized order to an ERP system for inventory allocation, or update a CRM system with the latest customer order history. This integration ensures that systems reflect the current state of the order and that downstream processes, such as inventory management and shipping, are initiated without delay.

At operation 635, the SPOG UI is configured to present the finalized order to the user for review and confirmation. The Dynamic User Interface Engine can provide a customizable view of the order details, allowing the user to verify aspects of the order, including product details, pricing, and shipping information. If any discrepancies are found, the user can make adjustments directly within the SPOG UI, which will trigger updates to the underlying data layers via the RTDM and AAML. Once the order is confirmed, the user can finalize the transaction with a single click, initiating the fulfillment process.

At operation 640, the system generates a Confirmation and Notification through the Notification and Alert System. The system is configured to send a confirmation email to the customer, summarizing the order details and providing an expected delivery timeline. In addition, the system can generate internal notifications to alert relevant teams, such as the warehouse or shipping departments, that a new order has been finalized and is ready for processing. These notifications ensure that stakeholders are informed and that the order fulfillment process can begin promptly.

Finally, at operation 645, the system engages the Audit and Compliance Tracker to log the entire process for future reference. This tracker is configured to record steps in the order generation process, from email ingestion to final confirmation, creating a detailed audit trail that can be used for compliance purposes or to troubleshoot any issues that arise later. The data captured by the Audit and Compliance Tracker can also be used to generate reports or conduct performance reviews, providing valuable insights into the efficiency and accuracy of the email-to-order process.

In summary, Method 600 outlines a comprehensive process flow for automating the conversion of email orders into structured order entries using generative AI. By integrating advanced data processing, predictive analytics, and a user-friendly interface, the system can process email orders efficiently and accurately, reducing manual effort and improving operational throughput. This automated approach not only streamlines order processing but also ensures that relevant data is synchronized across the enterprise, enabling faster and more informed decision-making.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for automating email-to-order conversion, comprising:
    a server, coupled to a processor, and configured to execute instructions that:
        receive an email containing order details, the email being processed by an Email Parser configured to extract relevant order information, the extraction based on at least one of: large language model (LLM) algorithms, natural language processing (NLP) algorithms, attachment processing, and cross-referencing with a data layer, wherein the Email Parser is further configured to generate a draft structured order entry using a generative AI model trained on historical email orders and customer-specific product data, wherein the draft order entry includes inferred values for one or more missing or ambiguous fields based on prior order context;
        convert the extracted order information into a structured order entry using an Order Generation Engine, the conversion based on at least one of: customer-specific product codes, data normalization, and real-time currency conversion;
        synchronize the structured order entry with external systems via an Integration Gateway, the synchronization based on at least one of: data format translation, communication protocol adaptation, and real-time data updates.

2. The system of claim 1, wherein the Email Parser is further configured to:
    process various email formats and attachments, including PDFs and spreadsheets, by employing machine learning models to adapt parsing rules dynamically based on at least one of: historical email formats and new email patterns.

3. The system of claim 1, wherein the Order Generation Engine is further configured to:
    apply predictive analytics provided by a Predictive Analytics Engine to optimize order generation, the optimization based on at least one of: customer order history, inventory levels, and market trends.

4. The system of claim 1, wherein the Integration Gateway is further configured to:
    integrate with one or more Enterprise Resource Planning (ERP) systems and/or Customer Relationship Management (CRM) systems based on at least one of: real-time data synchronization, API-based communication, and system-specific data mapping.

5. The system of claim 1, further comprising:
    a Real-Time Data Mesh (RTDM) configured to manage data exchange between the Email Parser and the Order Generation Engine, the management based on at least one of: Change Data Capture (CDC) mechanisms, data transformation, and data harmonization processes.

6. The system of claim 5, wherein the RTDM further comprises:
    a Data Transformation Module configured to standardize and cleanse extracted order data, the standardization based on at least one of: predefined business rules, data normalization techniques, and metadata management.

7. The system of claim 1, further comprising:
    a Single Pane of Glass (SPoG) User Interface (UI) configured to present the structured order entry to a user for review and confirmation, the presentation based on at least one of: dynamic user interface customization, real-time data visualization, and collaborative order management tools.

8. A computer-implemented method, comprising:
    receiving an email containing order details by an Email Parser;
    extracting relevant order information from the email using natural language processing (NLP) algorithms and attachment processing techniques, wherein the Email Parser is configured to generate a draft structured order entry using a generative AI model trained on historical email orders and customer-specific product data, wherein the draft order entry includes inferred values for one or more missing or ambiguous fields based on prior order context;

converting the extracted order information into a structured order entry using an Order Generation Engine, wherein the conversion includes customer-specific product codes and data normalization;

synchronizing the structured order entry with external systems via an Integration Gateway, wherein the synchronization includes real-time data updates and communication protocol adaptation.

9. The method of claim 8, further comprising:

adapting parsing rules dynamically based on historical email formats and new email patterns by the Email Parser.

10. The method of claim 8, further comprising:

optimizing order generation using predictive analytics, wherein the optimization includes analyzing customer order history, inventory levels, and market trends by a Predictive Analytics Engine.

11. The method of claim 8, further comprising:

integrating the structured order entry with Enterprise Resource Planning (ERP) systems and Customer Relationship Management (CRM) systems by the Integration Gateway.

12. The method of claim 8, further comprising:

managing data exchange between the Email Parser and the Order Generation Engine by a Real-Time Data Mesh (RTDM), wherein the management includes Change Data Capture (CDC) mechanisms, data transformation, and data harmonization.

13. The method of claim 12, further comprising:

standardizing and cleansing extracted order data using a Data Transformation Module, wherein the standardization includes applying predefined business rules and data normalization techniques.

14. The method of claim 8, further comprising:

presenting the structured order entry to a user for review and confirmation through a Single Pane of Glass (SPoG) User Interface (UI), wherein the presentation includes dynamic user interface customization and real-time data visualization.

15. A non-transitory tangible computer-readable device having instructions stored thereon that, when executed by a computing device, cause the computing device to perform operations comprising:

receiving an email containing order details by an Email Parser;

extracting relevant order information from the email using one or large language model (LLM) algorithms and attachment processing techniques, wherein the Email Parser is configured to generate a draft structured order entry using a generative AI model trained on historical email orders and customer-specific product data, wherein the draft order entry includes inferred values for one or more missing or ambiguous fields based on prior order context;

converting the extracted order information into a structured order entry using an Order Generation Engine, wherein the conversion includes customer-specific product codes and data normalization;

synchronizing the structured order entry with external systems via an Integration Gateway, wherein the synchronization includes real-time data updates and communication protocol adaptation.

16. The non-transitory tangible computer-readable device of claim 15, further comprising instructions that cause the computing device to perform operations comprising:

adapting one or more parsing rules dynamically based on historical email formats and new email patterns by the Email Parser.

17. The non-transitory tangible computer-readable device of claim 15, further comprising instructions that cause the computing device to perform operations comprising:

optimizing order generation using predictive analytics, wherein the optimization includes analyzing customer order history, inventory levels, and market trends by a Predictive Analytics Engine.

18. The non-transitory tangible computer-readable device of claim 15, further comprising instructions that cause the computing device to perform operations comprising:

integrating the structured order entry with Enterprise Resource Planning (ERP) systems and Customer Relationship Management (CRM) systems by the Integration Gateway.

19. The non-transitory tangible computer-readable device of claim 15, further comprising instructions that cause the computing device to perform operations comprising:

managing data exchange between the Email Parser and the Order Generation Engine by a Real-Time Data Mesh (RTDM), wherein the management includes Change Data Capture (CDC) mechanisms, data transformation, and data harmonization.

20. The non-transitory tangible computer-readable device of claim 19, further comprising instructions that cause the computing device to perform operations comprising:

standardizing and cleansing the extracted order data using a Data Transformation Module, wherein the standardization includes applying predefined business rules and data normalization techniques.

* * * * *